US005649154A

United States Patent [19]
Kumar et al.

[11] Patent Number: 5,649,154
[45] Date of Patent: Jul. 15, 1997

[54] CACHE MEMORY SYSTEM HAVING SECONDARY CACHE INTEGRATED WITH PRIMARY CACHE FOR USE WITH VLSI CIRCUITS

[75] Inventors: Rajendra Kumar, Sunnyvale; Paul G. Emerson, San Jose, both of Calif.

[73] Assignee: Hewlett-Packard Company, Palo Alto, Calif.

[21] Appl. No.: 547,047

[22] Filed: Oct. 23, 1995

Related U.S. Application Data

[63] Continuation of Ser. No. 282,691, Jul. 29, 1994, abandoned, which is a continuation-in-part of Ser. No. 842,907, Feb. 27, 1992, abandoned.

[51] Int. Cl.$^6$ .................................................. G06F 12/08
[52] U.S. Cl. ........................... 395/449; 395/403; 395/452; 395/455
[58] Field of Search ..................... 395/449, 403, 395/444, 447, 450, 455, 419, 452

[56] References Cited

U.S. PATENT DOCUMENTS

| | | | |
|---|---|---|---|
| 4,464,717 | 8/1984 | Keeley et al. | 395/449 |
| 4,823,259 | 4/1989 | Aichelmann, Jr. et al. | 395/449 |
| 4,831,625 | 5/1989 | Chiu et al. | 371/51.1 |
| 5,058,006 | 10/1991 | Durdan et al. | 395/325 |
| 5,095,424 | 3/1992 | Wofinden et al. | 395/450 |
| 5,113,510 | 5/1992 | Hillis | 395/425 |
| 5,136,700 | 8/1992 | Thacker | 395/449 |
| 5,170,476 | 12/1992 | Laakso et al. | 395/467 |
| 5,201,041 | 4/1993 | Bohner et al. | 395/465 |
| 5,202,968 | 4/1993 | Sato | 395/447 |
| 5,210,849 | 5/1993 | Takahashi et al. | 395/425 |
| 5,214,765 | 5/1993 | Jensen | 395/425 |
| 5,224,217 | 6/1993 | Zangenehpour | 395/463 |
| 5,226,009 | 7/1993 | Arimoto | 365/189.04 |
| 5,249,282 | 9/1993 | Segers | 395/425 |
| 5,261,066 | 11/1993 | Jouppi et al. | 395/449 |
| 5,285,323 | 2/1994 | Hetherington et al. | 395/449 |
| 5,535,359 | 7/1996 | Hata et al. | 395/446 |
| 5,537,571 | 7/1996 | Deville | 395/460 |

FOREIGN PATENT DOCUMENTS

| | | |
|---|---|---|
| 0 457 403 A2 | 11/1991 | European Pat. Off. . |
| 2 235 554 | 3/1991 | United Kingdom . |
| 2 248 952 | 4/1992 | United Kingdom . |

OTHER PUBLICATIONS

Hwang, Kai, Fayé A. Briggs, "Computer Architecture and Parallel Processing"; McGraw-Hill, 1984, pp. 102-107.

Jouppi, N.P., "Improving Direct-Mapped Cache Performance by the Addition of a Small Fully-Associative Cache and Prefetch Buffers", Proceedings, The 17th, Annual International Symposium of Computer Architecture, May 28-31, 1990, IEEE Computer Society Press, pp. 364-373. (First page of article not available to applicants).

(List continued on next page.)

*Primary Examiner*—Matthew M. Kim

[57] ABSTRACT

A cache memory system with a secondary cache integrated with a direct mapped primary cache in a single structure preferably constructed on a VLSI chip. The secondary cache uses the same output data bitlines, sense amplifiers, and bus drivers as the direct mapped cache. In a first machine cycle, input address tags are simultaneously compared to tag bits in the primary cache and the secondary cache. If the comparison results in a miss in the primary cache and a hit in the secondary cache, the secondary cache data is fed to the microprocessor in the next machine cycle, precluding the need for a main memory access. Thus, allowing data to be read directly from the secondary cache without using an extra machine cycle to load it first into the direct cache. The secondary cache comprises a miss cache which is loaded from main memory with data missing from the primary cache in the first machine cycle. Alternatively, the secondary cache comprises a victim cache which is loaded with a line of the primary cache which is replaced after loading missed data from main memory.

24 Claims, 5 Drawing Sheets

OTHER PUBLICATIONS

De Blasi, "Computer Architecture", ISBN 0-201-41603-4 (Addison-Wesley, 1990), pp. 273-291.

Stone, "High Performance Computer Architecture", ISBN 0-2-1-51377-3 (Addison-Wesley, 2d Ed. 1990), pp. 29-39.

Tabak, "Advanced Microprocessors", ISBN 0-07-062807-6 (McGraw-Hill, 1991) pp. 244-248.

"Second-Level Shared Cache Implementation for Multiprocessor Computers with a Common Interface for the Second-Level Shared Cache and the Second-Level Private Cache", IBM Technical Disclosure Bulletin, vol. 33, No. 11, Apr. 1991.

Hochstedler, Charles M., "Second-Level-Cache Steigert Systemleistung", Design&Elektronik, vol. 18.9, 1990, pp. 86-88.

Eichele, Herbert, "Multiprozessorsysteme", Chap. 5, B. G. Teubner, 1990.

Fig. 1
DIRECT-MAPPED CACHE
(PRIOR ART)

CACHE MEMORY SYSTEM HAVING SECONDARY CACHE INTEGRATED WITH PRIMARY CACHE FOR USE WITH VLSI CIRCUITS

CROSS REFERENCE TO RELATED APPLICATION

This is a continuation of application Ser. No. 08/282,691 filed on Jul. 29, 1994, now abandoned, which is a continuation of application Ser. No. 07/842,907 filed on Feb. 27, 1992, now abandoned.

FIELD OF THE INVENTION

This invention generally relates to electronic cache memory circuit architectures and processing methods. The invention specifically relates to cache memory architectures and instruction cache architectures for very large scale integrated (VLSI) circuits in which a secondary cache is constructed adjacent to a primary cache and is queried upon a miss from the primary cache.

BACKGROUND OF THE INVENTION

In general, random access memory (RAM) integrated circuits (ICs) operate far slower than advanced microprocessors. Designers of microprocessors have discovered that slow RAM access times present a significant impediment to increasing processor throughput and the speed of program execution. For example, advanced reduced instruction set computer (RISC) microprocessors may use a clock speed of 20 MHz or more so that theoretically 20 million instructions per second are executed. However, typical RAM cycle time (response time) is 150 nanoseconds. Therefore, when a microprocessor needs to retrieve a new data value or instruction from RAM, many microprocessor cycles can be wasted while the microprocessor waits for the RAM to respond.

To overcome this bottleneck, microcomputers and microprocessors use cache memories to improve memory access time. Cache memory is similar to virtual memory in that a high-speed cache memory stores a duplicate copy of an active portion of a low-speed RAM. Typically cache memory is located on the microprocessor chip so that access time is four to twenty times faster than main memory.

In operation, when a memory request is generated by the microprocessor, the request is presented to the cache memory, and if the cache cannot respond, the request is then presented to main memory. When the microprocessor attempts to access an item that is not in the cache, but is resident in main memory, a "cache miss" occurs. In response to a cache miss, the cache is updated by loading the needed data from main memory into the cache. The data is then fed from the cache to the microprocessor. The line in a cache not containing the desired data or instruction is called a "victim" line.

The time available for updating the status of a cache during a cache miss is miniscule. Therefore, caches are controlled by hardware that can process cache misses automatically within the required time. Unfortunately, in prior art circuits every cache miss requires updating the cache by accessing main memory, which significantly slows microprocessor throughput. Therefore, one goal of the present invention is to improve throughput by reducing the number of main memory accesses occurring after a cache miss.

Caches have been constructed in three principal types: direct-mapped, set-associative, and fully-associative. Details of the three cache types are described in the following prior art references, the contents of which are hereby incorporated by reference: De Blasi, "Computer Architecture," ISBN 0-201-41603-4 (Addison-Wesley, 1990), pp. 273–291; Stone, "High Performance Computer Architecture," ISBN 0-201-51377-3 (Addison-Wesley, 2d Ed. 1990), pp. 29–39; Tabak, "Advanced Microprocessors," ISBN 0-07-062807-6 (McGraw-Hill, 1991) pp. 244–248. These references are well known to those skilled in the art.

Figure 1:
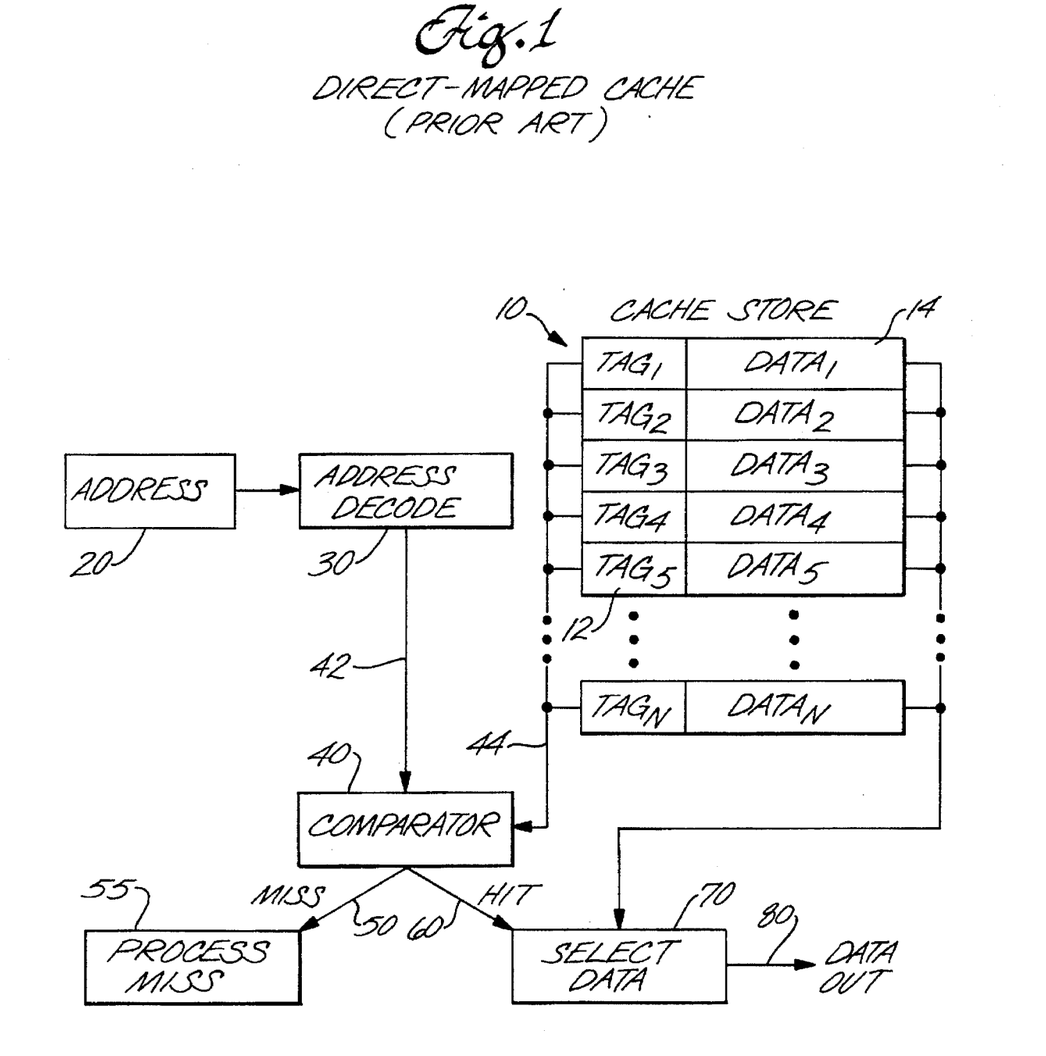
FIG. 1 is a block diagram of elements of a direct-mapped cache memory known in the prior art.

In all three types of caches, an input address is applied to comparison logic. Typically a subset of the address, called tag bits, are extracted from the input address and compared to tag bits of each cache entry. If the tag bits match, corresponding data is extracted from the cache. The general structure and processing of a direct-mapped cache are shown in FIG. 1. The direct-mapped cache includes a cache store 10 which can be implemented as a table comprising a plurality of tags 12 and data elements 14. Tags and data are accessed as a pair. An input address 20 is fed from a microprocessor to an address decode circuit 30 which separates tag bits from the input address 20. The tag bits are fed as a first input 42 to a comparator 40. The comparator also receives a second input 44 which comprises tag bits from the cache store 10 at a location pointed to by the low order bits of the input address. Thus, the low order input address bits point to a unique tag in the cache store. If a match is found by the comparator 40, then the comparator activates (or "asserts") its hit output 60, causing a data select circuit 70 to read a data element 14 from the cache store. Since the tags and data elements are arranged in pairs, the data select circuit receives the data element corresponding to the matched tag. The selected data is fed as output 80 from the cache memory to the microprocessor for further processing.

If no match is found between the first input 42 and the location in the cache store pointed to by the low order bits of the input address, the comparator asserts its miss output 50. This triggers miss processing (represented by block 55) which, in most prior art devices, requires accessing main memory.

In general, direct-mapped caches provide fastest access but requires the most time for comparing tag bits. Fully-associative caches provide fast comparison but consume higher power and require more complex circuitry.

In the prior art, caches have been susceptible to "thrashing." Thrashing results when the microprocessor repeatedly seeks a desired data item, fails to find it, updates the cache with the item, and then later replaces the line with a different item. This causes a cycle of repeated cache misses relating to the same data items.

Avoidance of thrashing is usually accomplished by using a large set-associative cache. However, such caches have several disadvantages. First, reading and writing to the cache occurs in a separate machine cycle executed after all cache tag compare operations, which increases cache access time. This also reduces microprocessor performance by lengthening machine cycle time or requiring delay cycles. Second, power dissipation in the cache increases significantly, because in an n-way set-associative cache, n times as many words have to be read before a selection is made for a given word based on tag compares. Third, cache operation is highly susceptible to circuit switching noise when multiple sense amplifiers trigger simultaneously. This susceptibility is acute in machines with word sizes of 32 bits or more, as well as in machines with multi-port caches in which multiple words can be simultaneously read through a plurality of cache ports.

Thus, one goal of the present invention is to provide a cache with thrash avoidance without using a set-associative implementation.

A prior researcher has discussed use of a victim cache or miss cache as a backup to a primary direct-mapped cache. An architectural definition of secondary caches (termed "victim/miss caches") to avoid thrashing and improve hit ratio is disclosed in N. Jouppi, "Improving Direct-Mapped Cache Performance by the Addition of a Small Fully-Associative Cache and Prefetch Buffers," Proceedings of the 17th Annual Int'l Symposium on Computer Architecture, IEEE Computer Society Press, May 1990, pp. 364–373, the contents of which are hereby incorporated by reference. However, Jouppi fails to teach a VLSI implementation of secondary caches, and also fails to teach integration of primary and secondary caches using shared bitlines, sense amplifiers, and bus interface logic.

In the past, cache memory has also been used for caches of instructions rather than data. In the prior art, instruction caches, instruction buffers, and branch target buffers have been implemented either on separate chips, or as separate modules in a single chip. Unfortunately, these prior art approaches require a large amount of bus circuitry to interconnect the chips or modules. This requires more area (either board space or silicon area) which increases system cost. Moreover, cache access time is increased significantly as a result of the need to propagate signals through additional gates and buffers.

SUMMARY OF INVENTION

The present invention provides an efficient cache memory system with a secondary cache integrated with a direct mapped primary cache. Use of a secondary cache avoids thrashing, and improves the hit ratio, while preserving the inherent efficiency of a direct mapped cache. According to the invention, a secondary cache is integrated with a direct mapped cache in a single structure preferably constructed on a VLSI chip. The secondary cache is embedded in a direct mapped cache and uses the same bitlines, sense amplifiers, and bus drivers as the direct mapped cache. Input address tags are simultaneously compared to tag bits in the primary cache and the secondary cache. If the comparison results in a miss in the primary cache and a hit in the secondary cache, the secondary cache data is fed to the microprocessor in the next machine cycle, precluding the need for a main memory access. Thus, the invention allows data to be read directly from the secondary cache without using an extra machine cycle to load it first into the direct cache. Preferably the invention is implemented in a single VLSI chip. In one embodiment, the secondary cache comprises a miss cache which is loaded from main memory with data not found in a query to the primary cache.

In an alternative embodiment, the secondary cache comprises a victim cache; it is loaded with a victim line of the primary cache. A victim line in the primary cache is a line which is replaced after loading missed data from main memory into the primary cache.

In another alternative embodiment, the invention provides an instruction cache with a two-level prefetch mechanism which enables efficient processing of branch instructions, without requiring accessing main memory to load branch target instructions.

DETAILED DESCRIPTION OF PREFERRED EMBODIMENTS

In the following detailed description of the preferred embodiments, specific terminology is used for the sake of clarity. However, the invention is not limited to the specific terms selected, but rather includes all technical equivalents functioning in a substantially similar manner to achieve a substantially similar result.

Figure 2:
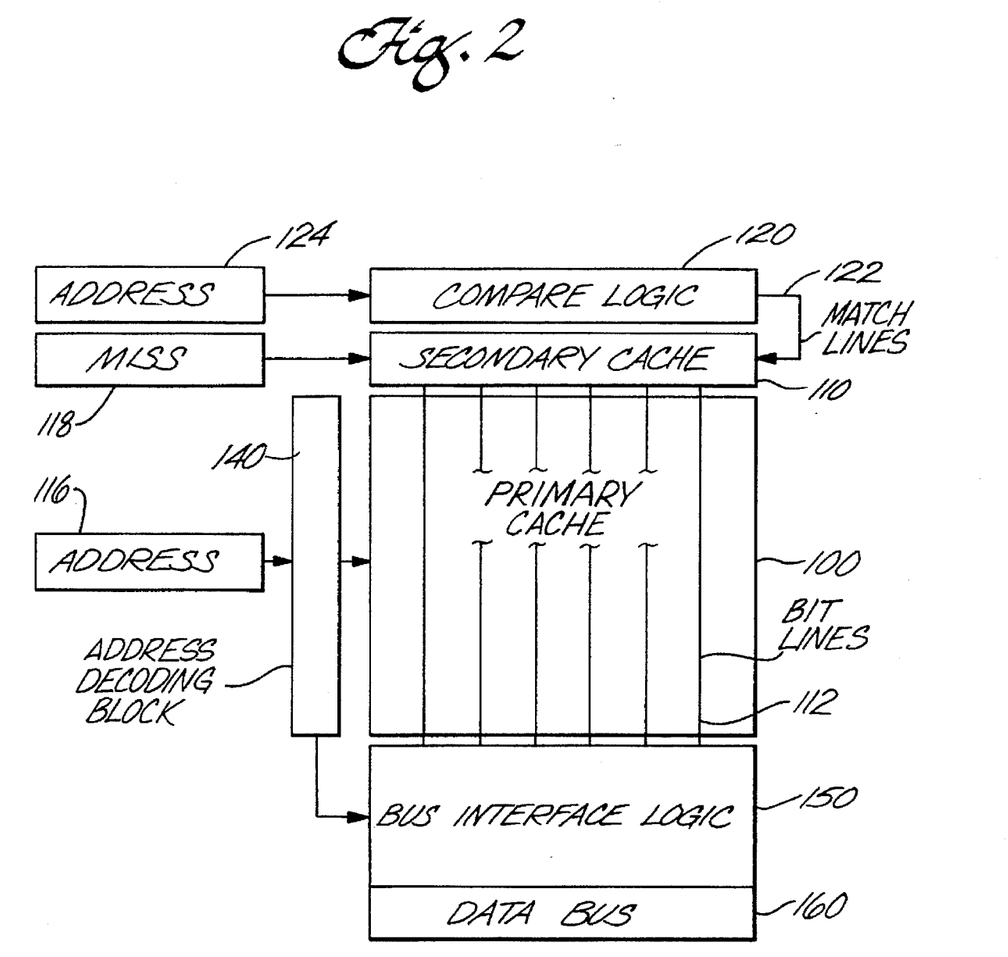
FIG. 2 is a block diagram of elements of an integrated direct-mapped primary cache and fully associative secondary cache memory system of the present invention.

A block diagram of an embodiment of the invention, constructed as a data cache, is shown in FIG. 2. This diagram represents one possible "floor plan" of the arrangement of elements of the invention on a silicon wafer or semiconductor chip. A primary cache data store 100 forms the heart of the system. The primary data store 100 preferably comprises conventional static random access memory (SRAM) cells, arranged in a two-dimensional array. One axis of the array comprises a plurality of data bitlines 112 each coupled to bus interface logic 150, which in turn is coupled to a data bus 160 of a microprocessor. As is known in the art, interface logic 150 comprises sense amplifiers for sensing the contents of the store 100, write logic for sending write signals to cells of the store 100, and bus drivers and data buffers for buffering and amplifying output data from the store to the data bus 160. Components of the interface logic 150 are well known in the art.

The primary cache is formed as a direct-mapped cache, accessed by feeding an address 116 to address decoding logic 140. As discussed above with reference to FIG. 1, the decoding logic provides low order address bits to the primary store 100 and tag address bits to comparators in the interface logic 150. However, the embodiment of FIG. 2 also includes a secondary cache 110 constructed on top of or adjacent to the primary store 100. Preferably the secondary cache is constructed as a small fully-associative buffer, capable of storing about four to eight lines. Of course, the number of lines in the secondary cache can be varied based on the application. The memory cells of the secondary cache preferably are identical in structure as the cells of the primary cache. A fully associative comparator 120, or compare logic, is coupled to the memory cells of the secondary cache by a plurality of match lines represented by arrow 122. In a first processing cycle, the compare logic uses conventional content addressable memory (CAM) cells to compare an input virtual or physical address 124 with addresses stored in each of the CAM cells. If there is a match, the match line of the corresponding entry is asserted. Then if the direct-mapped cache 100 reports a miss, in a second machine cycle the system asserts a miss input 118 coupled to the secondary cache. This causes the match line of the secondary cache to drive a word line (not shown) of the secondary cache, resulting in data output from the secondary cache. Output data from the secondary cache is placed on the bitlines 112 and thereby transferred to the data bus 160 using the same sense bus interface logic 150 used when a hit occurs in the direct-mapped cache.

Figure 3:
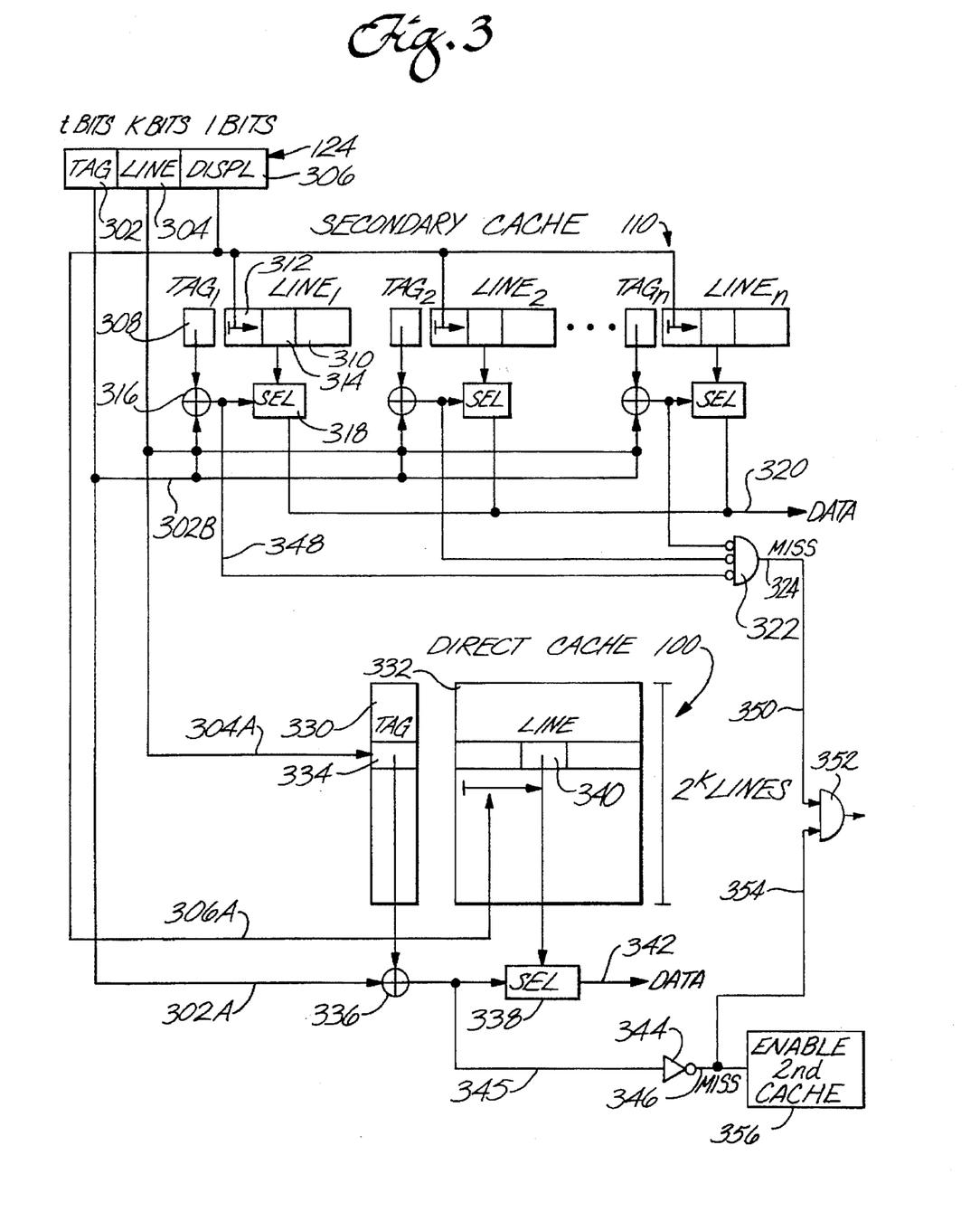
FIG. 3 is a more detailed structural diagram of the primary and secondary caches of FIG. 2.

FIG. 3 depicts logical connection of the elements of FIG. 2. In FIG. 3, secondary cache 110 and primary or direct-mapped cache 100 are each coupled to a single address input 124. After decoding by an address decoder (not shown), the decoded address has three logical components: tag bits 302; a line number 304; and a displacement value 306. The direct cache 100 comprises a tag list 330 and a plurality of data lines 332. The tag bits of the address input are coupled on line 302A to a comparator 336. The line number is coupled on line 304A to the tag list. As is known in the art, a direct cache with this structure enables the line number to select a discrete tag 334 from the tag list. The discrete tag is fed to the comparator and if there is a match between the discrete tag and the tag bits, the comparator triggers a selector 338 to retrieve a data item 340 from one of the data lines 332. The data item can be selected using the displacement value 306 as an offset from the start of the selected line. The data item is then placed on a data output line 342 for transfer to an arithmetic/logical unit (ALU) of a microprocessor or another part of the microprocessor.

If no match is found by the comparator, the comparator generates a miss signal on line 345. This signal can be coupled to an inverter 344 to drive a high MISS signal line 346. Also, this miss signal drives a miss enable circuit 356 to cause the microprocessor to read data from the secondary cache. The miss enable circuit is coupled to the secondary cache through conventional means.

Access to the secondary cache 110 uses fully-associative logic for simultaneously comparing the tag bits to all tags of a small set of lines. In the embodiment of FIG. 3 three pairs of tags (TAG1, TAG2 ... TAGn) and lines are shown, but any number of pairs of tags and lines can be used. Thus, the secondary cache 110 is formed as a plurality of tags, lines, and interconnecting circuitry rather than as a two-dimensional array used for the direct cache 100. As is known in the art, increasing the number of pairs of tags and lines does result in a decrease in processing time and an increase in power dissipation. Also, reference numerals are shown only for one tag 308 and one line 310, but the same parts form each of the other pairs of tags and lines.

To address the secondary cache, the tag bits are coupled on line 302B to comparator 316 and also to each other comparator associated with every other pair of tags and lines. As is known in the art, in a fully-associative system, all the comparators simultaneously compare the tag bits to the tag associated with the comparator. Thus, the comparator 316 compares the tag 308 to the tag bits at the same time the other comparators are conducting a comparison. If a hit occurs (and if the miss enable circuit 356 has enabled the secondary cache after a miss by the direct cache) the comparator triggers a selector 318 which extracts a data element 314 from the line 310. Since several comparators are simultaneously carrying out a comparison, any of the comparators in FIG. 3 can report a hit and provide output data elements. The data element can be selected by using the displacement value as an offset 312 from the start of the line. The data element is fed by the selector to data output line 320 for use by the microprocessor.

If a miss occurs, the comparator asserts a miss line 348 which is coupled with the other miss lines to a 3-input NOR gate 322. If all the miss lines are asserted then the gate asserts an output miss line 324 to signal the microprocessor that no tag match was found in the secondary cache.

Miss signals from both the direct cache and the secondary cache are coupled on primary and secondary miss output lines 354, 350 to an AND gate 352. Thus, if both the miss output lines 350, 354 are asserted, the AND gate asserts a global miss output to instruct the CPU to that a miss occurred in both the direct cache and the secondary cache, so that accessing main memory is necessary.

In operation, this architecture enables data or instructions to be retrieved from either the direct-mapped cache or the secondary cache in a maximum of two machine cycles by the following steps. To reference a given tag location, in a first machine cycle the tag list 330 of the direct cache is accessed to determine whether there is a hit in the direct mapped cache. In a physically tagged cache, the tag line buffer is also accessed in this step. If a hit occurs, data is read from the direct-mapped cache store in the same first machine cycle.

If a miss occurs, then in the second machine cycle, the secondary cache is read if there was a hit in the secondary cache. According to this invention, an associative compare operation to compare the cache tag of the secondary cache is done in the first machine cycle, simultaneously with the direct mapped compare used to access the direct-mapped cache. The comparator 316 is active at the same time as the comparator 336. Thus, both the direct cache and the secondary cache are simultaneously tested in the first machine cycle; if there is a hit in the direct cache data is read in the same first machine cycle. If there is a miss in the direct cache and a hit in the secondary cache during the first machine cycle, then in a second cycle data is read from the secondary cache. The read operation of the secondary cache uses the same bit lines, sense amplifiers, and data bus as the direct-mapped cache.

The secondary cache can comprise a victim cache or a miss cache. The difference lies in how the caches are updated.

If a victim cache is used, a victim line in the direct cache to be replaced on a miss in the direct cache is copied to the victim cache, and replaced in the direct cache by a new line from main memory.

In a miss cache, the line brought in from main memory on a miss is stored simultaneously into the miss cache and the direct cache.

If a given line hits in the secondary cache, it can be read either directly from the secondary cache, or alternatively, it can be loaded into the direct-mapped cache and then read. The first case requires two machine cycles to read data for each cache access that hits in the secondary cache. However, unlike prior art systems, there is no penalty incurred in transferring a cache line from the secondary cache to the direct-mapped cache.

In the second case, an age- or use-tracking mechanism, such as a counter, can be used to monitor the number of accesses of a line in the secondary cache. If this number exceeds some preset value, then the line can be loaded into the direct cache for future direct cache accesses. In this case the line that is transferred to the direct mapped cache would be accessed only in one cycle, but two cycles of overhead would be required for transferring the line. One cycle would be reading the line from the secondary cache into the data buffer, and another cycle to write this line back into the direct cache. However, once the line is read from the secondary cache, it can be forwarded to the CPU as soon as it is available.

This invention can be used for instruction caches and data caches, as well as unified caches which hold both instructions and data. Also, the invention works for both the victim cache as well as the miss cache. The only difference is the way the lines are replaced in the cache. Further, this invention can be used for multi-ported caches.

Figure 4:
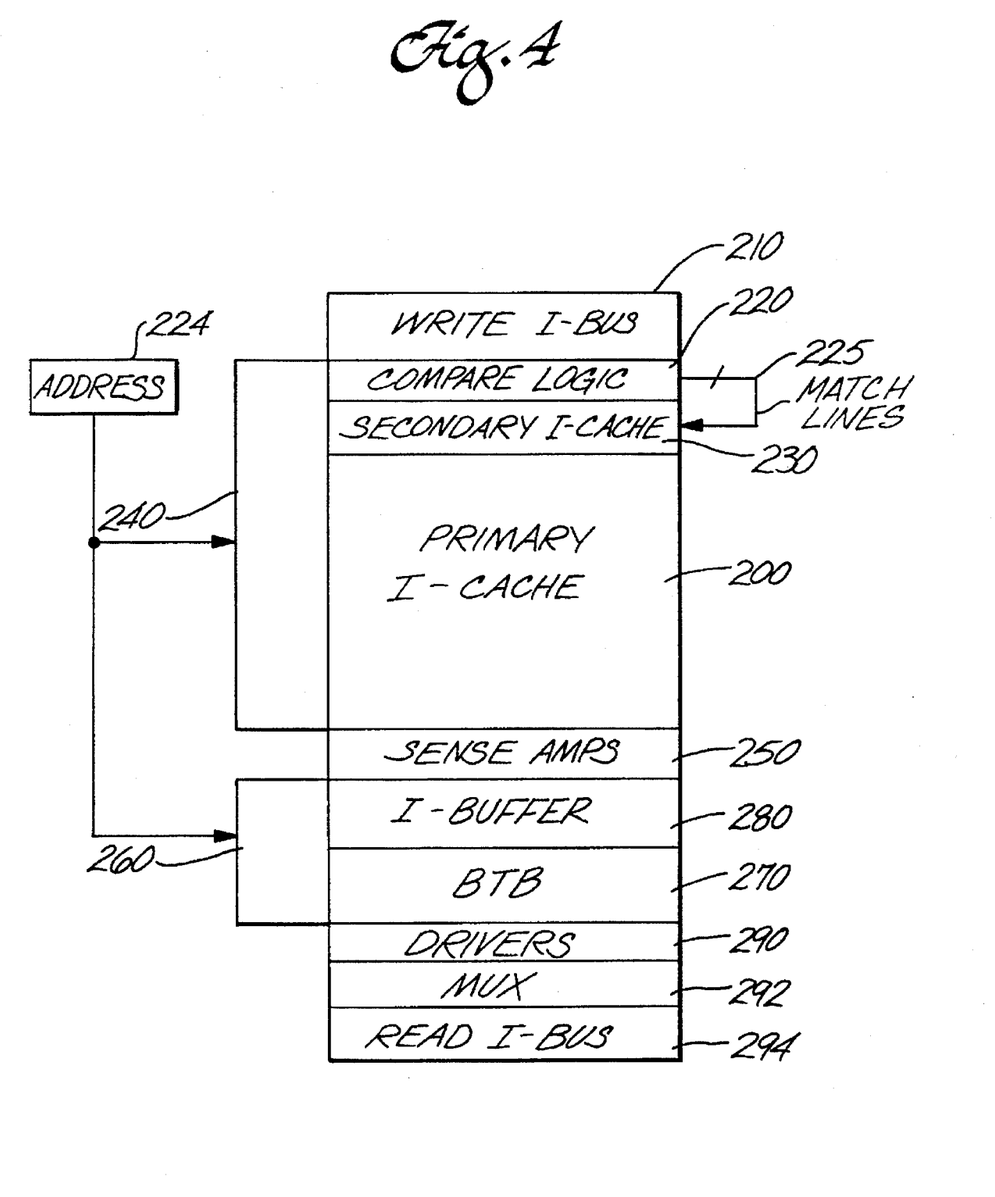
FIG. 4 is a block diagram of an alternate embodiment of FIG. 2 organized as an instruction cache.
Figure 5:
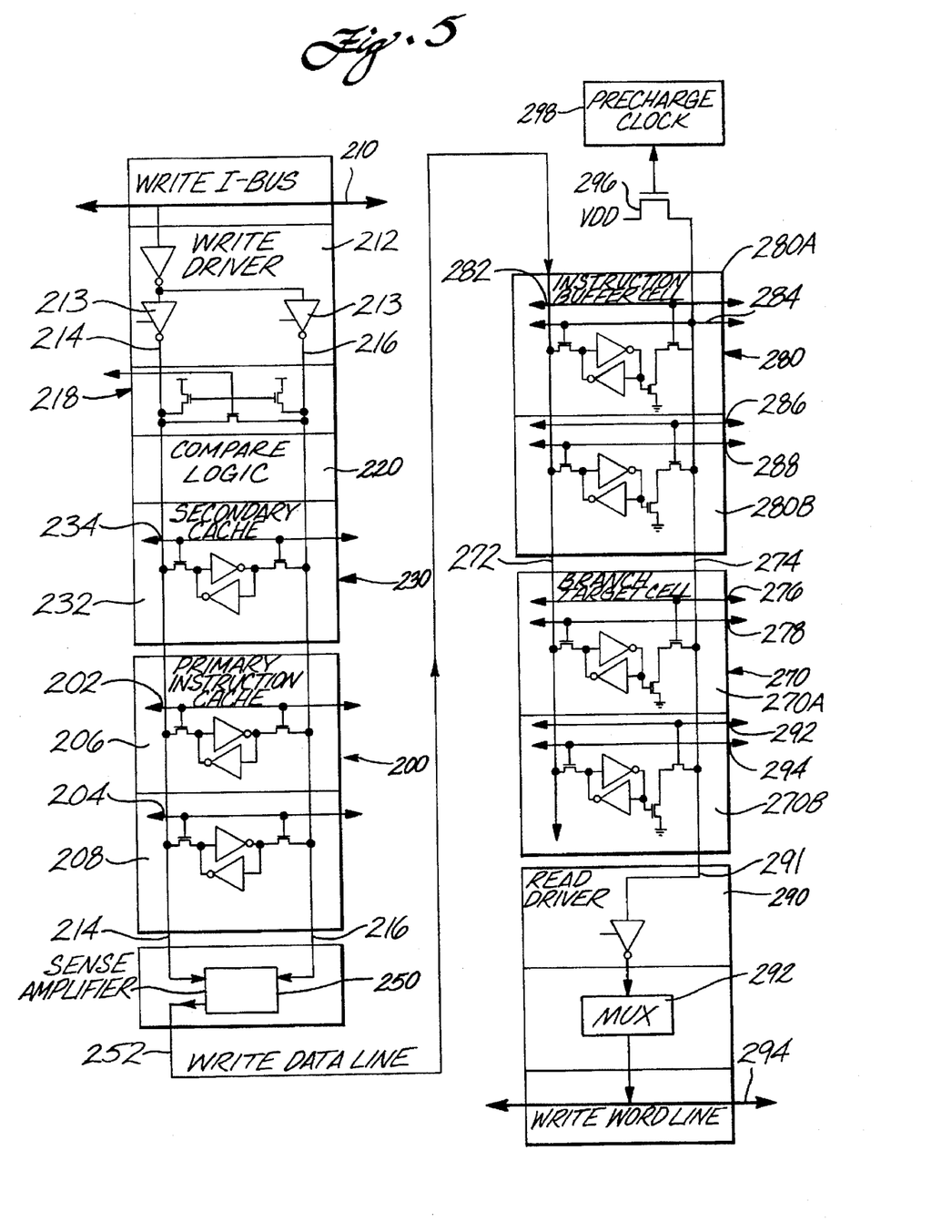
FIG. 5 is a more detailed structural diagram of one of a plurality of slices from the instruction cache of FIG. 4.

An embodiment of an instruction cache ("I-cache") is shown in FIGS. 4 and 5. This embodiment provides an efficient I-cache with an integrated instruction buffer (IB), branch target buffer (BTB), and victim cache (VC) on a single VLSI integrated circuit chip. The hardware enables prefetch processing in which the IB or the BTB can be filled from the I-cache while instructions are being issued to the microprocessor from the IB or BTB.

In an alternative contemplated embodiment, the I-cache of FIGS. 4 and 5 can be used as a first level cache in a system with a second level cache. In such an embodiment, the hardware also enables prefetch from level 2 to level 1, while instructions continue to be issued from the IB or the BTB. The use of the BTB can avoid delay during processing of a branch instruction. Its integration in the same I-cache structure requires less surface area and causes faster cycle time as compared to a case with separate IB/BTB structures. This structure can also implement an embedded secondary cache with minimal extra area.

FIG. 4 shows overall architecture of an I-cache embodiment of the invention. This embodiment provides two separate instruction buses, namely a read instruction bus 294 and a write instruction bus 210 (also respectively called a "read I-bus" and "write I-bus"). Separation of read and write functions enables concurrent issuance of instructions from the IB or BTB to the read I-buses while the I-cache prefetches instructions from the level 2 cache or from main memory to the write I-bus.

The circuits located between the write I-bus and the read I-bus are structurally similar to the data cache embodiment of FIGS. 2 and 3. An input address 224 is coupled via a first address decoder 240 to a primary instruction cache 200 which can be constructed as a two-dimensional array of pairs of tags and data lines. A secondary I-cache 230 is coupled to the primary I-cache and to the write I-bus via compare logic 220. A plurality of match lines 225 link the compare logic to storage cells in the secondary I-cache. The primary and secondary I-caches preferably share the same sense amplifiers 250, drivers 290, and dispersal multiplexer 292. Thus, in a manner similar to data cache processing described above, these shared components enable cache compares, and instruction transfers between the primary and secondary I-caches, to use a single machine cycle.

Two instruction buffers 270, 280 are constructed between the sense amplifiers 250 and the bus drivers 290. The branch target buffer (BTB) 270, discussed in detail below, provides storage space for target instructions following a branch. Thus, the BTB enables the microprocessor to store instructions logically ahead of the current instruction so that the future instructions are ready for immediate processing when a branch instruction is executed. An instruction buffer (I-buffer or IB) 280 provides scratchpad space for other future instructions. Both the IB and the BTB are coupled to the address 224 via a second address decoder 260. The internal structure of each of these components is well known in the art.

In an alternative embodiment, the compare logic and secondary I-cache are omitted. In operation of such an embodiment, the IB continually prefetches instructions from the I-cache until the IB is full. Instructions in the IB are then ready for immediate transfer to the instruction read bus when the microprocessor requests the next instruction. The IB itself preferably stores at least two instructions, and is formed as a first-in-first-out (FIFO) queue. The IB issues instructions from the head of the queue to the instruction read bus.

The IB examines future instructions not yet issued to the microprocessor. If the IB identifies a branch instruction yet to be executed, an external cache controller (not shown) switches prefetch to access instructions following the branch. These instructions are then loaded into the BTB.

The BTB is also implemented as a FIFO queue, and it stores the target instructions after a branch. When the branch instruction is executed, and the branch is actually taken, following instructions are issued from the BTB to the instruction read bus. While the BTB is issuing instructions, the IB can prefetch instructions if the BTB identifies a branch instruction. Thus, the IB and the BTB can switch roles on each branch.

Preferably, the size of words fetched from the I-cache into the IB and BTB is more than one instruction long. Therefore, several instructions can be simultaneously prefetched from the I-cache to the IB or BTB.

In an alternative embodiment, the external cache controller is provided with means to cause prefetch of instructions from a second-level external I-cache to the primary I-cache. The second-level external I-cache is different from the secondary I-cache discussed below. Preferably the second-level external I-cache is identical in structure to the primary I-cache and is coupled thereto using suitable cascading logic. Preferably, if a primary I-cache miss occurs during a prefetch from the primary I-cache into the IB or BTB, then the cache controller can prefetch an instruction from the second-level I-cache to the primary cache. Thus, the embodiment of FIG. 4 provides a two-level I-cache structure in which a prefetch can be launched from the second level I-cache to the first level cache. This helps to mask delays incurred during second level I-cache accesses, since the IB or BTB can issue instructions until the missed instruction actually comes to the head of the queue.

The dispersal multiplexer shown at the bottom of the cache issues instructions one at a time from a multiple instruction width IB or BTB. This ensures that the instructions issued from the cache system match the instruction length of the microprocessor.

In one embodiment, the secondary cache comprises a victim cache or a miss cache embedded in the I-cache structure. Preferably the secondary cache comprises a small fully-associative buffer as described above with reference to FIGS. 2 and 3. The compare logic 220 of the secondary cache can be placed on top of the secondary cache storage array. The match lines 225 from the compare logic are routed into the secondary cache storage array to drive its word lines. The secondary cache storage array cells (not shown) preferably are identical to the I-cache cells. The I-cache cells preferably are four-or six-transistor SRAM cells.

Details of the I-Cache are shown in FIG. 5. As will be recognized by one of skill in the art, FIG. 5 represents one of a plurality of parallel, identically constructed slices of a complete I-cache system. For example, from top to bottom of FIG. 5 only one exemplary device of each component type is shown. However, a complete I-cache implemented in silicon would comprise a plurality of side-by-side slices identical to the exemplary slice shown in FIG. 5.

The top half of an I-cache slice contains the write instruction bus, write drivers, precharge logic, associative compare logic, victim cache cells, I-cache cells, and sense amplifier. The bottom half contains instruction buffer cells, branch target buffer cells, read drivers, dispersal multiplexer, and read instruction bus.

The write I-bus 210 is indicated in FIG. 5 by an arrow extending from the slice illustrated in FIG. 5 to adjacent identical slices. The write I-bus 210 is coupled to a write driver section 212 having a plurality of write drivers 213. The output of the write drivers 213 are two parallel bit lines designated bit line 214 and not bit line 216. One of skill in the art will recognize that the bit line 214 and not bit line 216 operate at opposite logic levels. The bitlines are coupled through a precharge logic section to the primary and secondary cache array. As is known in the art, these sections store instructions on the write I-bus to the primary and/or secondary I-cache.

Coupled directly to the compare logic 220 is an exemplary secondary cache storage cell 232 of a secondary cache 230. The storage cell provides data output on a secondary cache word line 234. As indicated, the word line 234 extends into adjacent storage cells, like a bus, to enable transfer of instruction words from any storage cell.

Coupled to the same bit line and not bit line are a plurality of primary I-cache cells 206, 208. The I-cache cells 206, 208 provide output on word lines 202, 204, respectively. At the bottom of the top half of the I-cache of FIG. 5, the bit lines 214, 216 are coupled to a sense amplifier (SA) 250 which provides output data on a write data line 252. Internal construction of these components is known in the art.

The write data line 252 is coupled to an instruction buffer 280 at the top of the bottom half of the I-cache structure of FIG. 5. Two exemplary instruction buffer cells 280A, 280B are shown, each constructed as one element of a FIFO queue in a manner known in the art. Cell 280A is addressed on a read word line (read address line) 282 and a write word line (write address line) 284, whereas cell 280B is addressed on a read word line 286 and a write word line 288. Vertical write and read data lines 272, 274 connect cells 280A, 280B to each other and to a branch target buffer 270.

Two exemplary branch target cells 270A, 270B are shown in FIG. 5. Each cell 270A, 270B is constructed as one element of a FIFO queue in a manner known in the art. Cell 270A is addressed on a read word line 276 and write word line 278. Cell 270B is addressed on a read word line 292 and a write word line 294. The cells 270A, 270B are also coupled together by data lines or bitlines 272, 274. The topmost end of bitline 274 is coupled, in manner known in the art, through an NMOS transistor 296 to a precharge clock 298. This structure enables precharging the bitlines before reading or writing the cells.

Output data read from the cells 270A, 270B, 280A, 280B is provided to a read driver section 290 on a read output line 291. The output signal is amplified in the read driver section and fed to a dispersal multiplexer 292 which ensures that one instruction at a time is fed to read instruction bus 294.

Advantages of the invention when used as a data cache include efficiency by using a direct-mapped cache with an embedded victim/miss cache to avoid thrashing, improved cycle time, low power dissipation, area efficiency, and reduced sensitivity to sense amplifier switching noise. Advantages of the invention when used as an instruction cache include all the above and also a two-level I-cache prefetch mechanism, and a prefetch mechanism for coupling the I-cache to the instruction buffer and branch target buffer. These enhancements result in shorter cycle time for cache accesses, higher hit rates, and minimum silicon area.

The invention may be practiced in many ways other than as specifically disclosed herein. Thus, the scope of the invention should be determined from the appended claims, in which:

What is claimed is:

1. A multi-level cache memory system, comprising:
   bus interface logic;
   bitlines connected to the bus interface logic;
   an array of substantially identical memory cells arranged in lines and columns, the array of memory cells being divided into a primary store and a secondary store, the primary store including the memory cells in first ones of the lines, the secondary store including the memory cells in second ones of the lines, the memory cells in each one of the columns in the primary store and the memory cells in the one of the columns in the secondary store being coupled to a common one of the bitlines;

a direct-mapped primary cache comprising the primary store, primary comparing means for comparing an address input to the primary store with address data stored in the primary store, and means for generating a primary cache hit signal in response to a match and otherwise for generating a primary cache miss signal; and a fully-associative secondary cache comprising the secondary store, secondary comparing means for comparing an address input to the secondary store with address data stored in the secondary store simultaneously with the primary comparing means, and means for generating a secondary cache hit signal in response to a match and otherwise for generating a secondary cache miss signal.

2. The memory system of claim 1, wherein:
   the memory cells of the primary store comprise static random access memory (SRAM) cells;
   the primary comparing means comprises address decoding means for selecting one of the SRAM cells in response to an address input; and
   the means for generating the primary cache hit signal is for generating the primary cache hit signal in response to a match between the address input and one of the storage cells.

3. The memory system of claim 2, coupled to a microprocessor for executing instructions in a succession of discrete processing cycles, the system further comprising:
   means for simultaneously activating the primary comparing means and the secondary comparing means in a first processing cycle of the microprocessor; and
   hit reading means, operative in a second processing cycle, for selectively reading data from the secondary cache store in response to the cache hit signals.

4. The memory system of claim 3 additionally comprising means for interfacing the bitlines to an external data bus.

5. The memory system of claim 3, wherein the processing cycles comprise two single consecutive cycles of the microprocessor.

6. The memory system of claim 1, further comprising:
   at least one instruction buffer integrally coupled to the primary and secondary stores for simultaneous access thereto;
   a write instruction bus integrally coupled to the primary gore for loading the primary store with instructions; and
   a read instruction bus integrally coupled to the instruction buffer for transferring instructions from the primary and secondary stores to an execution unit in a microprocessor.

7. The memory system of claim 6, wherein:
   the instruction buffer comprises a general instruction buffer and a branch target buffer; and
   the memory system additionally comprises means for alternately loading instructions from the primary cache to either one of the general instruction buffer and the branch target buffer in response to a branch instruction.

8. The memory system of claim 1, further comprising:
a main memory coupled to the primary cache; and
means responsive to the primary cache miss signal for loading miss data from the main memory to both a storage cell of the secondary cache and a storage cell of the primary cache.

9. The memory system of claim 1, further comprising means, responsive to the primary cache miss signal, for selecting a victim line from the primary store, for transferring the contents of the victim line to the secondary store.

10. The memory system of claim 1, additionally comprising a common set of write buffers shared by both the primary store and secondary store.

11. The memory system of claim 10, additionally comprising a common set of sense amplifiers connected to the bitlines, the common set of sense amplifiers being shared by both the primary store and the secondary store.

12. The memory system of claim 11, wherein:
the memory system further comprises an instruction buffer including branch target cells, the branch target cells being integral with both the primary cache and the secondary cache, the branch target cells sharing a second set of bitlines; and
a write data line produced by the corresponding one of the sense amplifiers is coupled to one of the bitlines by one of the second set of bitlines.

13. In a multilevel cache memory system that includes plural instruction buffers,
bitlines connected to the instruction buffers,
an array of substantially identical memory cells arranged in lines and columns, the array being divided into a primary store and a secondary store, the primary store including the memory cells in first ones of the lines, the secondary store including the memory cells in second ones of the lines, the memory cells in each one of the columns in the primary store and the memory cells in the one of the columns in the secondary store being coupled to a common one of the bitlines,
a direct-mapped primary cache including the primary store, and primary comparing means for comparing an address input to the primary cache with address data stored in the primary cache,
a fully-associative secondary cache including the secondary store and secondary comparing means for comparing the address input to the secondary cache with address data stored in the secondary cache,
a write instruction bus coupled to the primary cache for loading the primary cache with instructions, and
a read instruction bus coupled to the instruction buffers for transferring instructions from the primary cache to an execution unit in a microprocessor,
a data processing method comprising steps of:
(a) providing an address input to the primary comparing means and the secondary comparing means;
(b) using the primary comparing means, testing whether the address input matches the address data stored in the primary cache, and generating a primary cache hit signal in response to a match;
(c) using the secondary comparing means, concurrently with step (b), testing whether the address input matches the address data stored in the secondary cache, and generating a secondary cache hit signal in response to a match; and
(d) selectively loading instructions to the read instruction bus from one of the primary cache and the secondary cache in response to steps (b) and (c).

14. The method of claim 13, further comprising steps of:
writing at least one new instruction to the secondary cache; and
loading the new instruction from the secondary cache to the primary cache in response to the primary cache hit signal indicating a miss.

15. The method of claim 14, further comprising a step of loading the new instruction to one of the instruction buffers in response to the primary cache hit signal indicating a hit.

16. The method of claim 13, further comprising a step of loading instructions to the read instruction bus by alternately reading the instruction buffers upon loading a branch instruction.

17. A multi-level cache memory system, comprising:
an instruction buffer;
bitlines connected to the instruction buffers;
an array of substantially identical memory cells arranged in lines and columns, the array being divided into a primary store and a secondary store, the primary store including the memory cells in first ones of the lines, the secondary store including the memory cells in second ones of the lines, the memory cells in each one of the columns in the primary store and the memory cells in the one of the columns in the secondary store being coupled to a common one of the bitlines;
a primary cache comprising the primary store, the primary store storing address data, primary comparing means for comparing an address input to the primary cache, and means for generating a primary cache hit signal in response to a match in the primary cache and for otherwise generating a primary cache miss signal;
a secondary cache comprising the secondary store, the secondary store storing address data, secondary comparing means, concurrently with said primary comparing means for comparing the address input to the secondary cache, and means for generating a secondary cache hit signal in response to a match in the secondary cache; and
a branch target buffer, integral with the secondary cache, for storing target instructions after a branch instruction.

18. The memory system of claim 17, wherein the primary store and the secondary store share a common set of sense amplifiers.

19. The memory system of claim 18, wherein the secondary comparing means compares the address input to the secondary cache simultaneously with the primary comparing means comparing the address input to the primary cache.

20. A method for operating a multi-level cache memory system that includes
an instruction buffer,
bitlines connected to the instruction buffer,
an array of substantially identical memory cells arranged in lines and columns, the array being divided into a primary store and a secondary store, the primary store including the memory cells in first ones of the lines, the secondary store including the memory cells in second ones of the lines, the memory cells in each one of the columns in the primary store and the memory cells in the one of the columns in the secondary store being coupled to a common one of the bitlines,
a primary cache including the primary store, and
a secondary cache including the secondary store,
the method comprising steps of:
(a) providing an address input to the primary cache and the secondary cache;

(b) determining whether the address input matches a line of the primary cache and generating a primary cache hit signal in response to a match;

(c) determining, concurrently with step (b), whether the address input matches a line of the secondary cache and generating a secondary cache hit signal in response to a match; and (d) selectively reading output data on the bitlines from one of the primary cache and the secondary cache in response to the primary cache hit signal and the secondary cache hit signal.

21. The method of claim 20, wherein:

the memory system further comprises a main memory coupled to the primary cache; and the method further comprises steps of:
generating a primary cache miss signal if the address input fails to match a line of the primary cache, and
loading miss dam from the main memory to both the secondary cache and the primary cache in response to the primary cache miss signal.

22. The method of claim 20, wherein:

the memory system further comprises a main memory coupled to the primary cache; and the method further comprises steps of:
generating a primary cache miss signal if the address input fails to match a line of the primary cache,
selecting a victim line from the primary store, and
transferring the contents of the victim line to the secondary store in response to the primary cache miss signal.

23. The method of claim 20, wherein:

the memory system is coupled to a microprocessor, the microprocessor executing instructions in a succession of discrete processing cycles;

steps (b) and (c) are carried out in a first processing cycle of the microprocessor; and step (d) comprises the substep of reading output data from the secondary cache during a second processing cycle of the microprocessor in response to the primary cache hit signal indicating a miss and the secondary cache hit signal indicating a hit.

24. The method of claim 23, wherein the first and second processing cycles are consecutive.

* * * * *